United States Patent
Feliv et al.

(10) Patent No.: US 9,200,702 B2
(45) Date of Patent: Dec. 1, 2015

(54) DRIVER AWARE ADAPTIVE SHIFTING

(71) Applicant: FORD GLOBAL TECHNOLOGIES, LLC, Dearborn, MI (US)

(72) Inventors: Dimitar P. Feliv, Novi, MI (US); Davorin D. Hrovat, Ann Arbor, MI (US); Hong Jiang, Birmingham, MI (US); Yuji Fujii, Ann Arbor, MI (US); Hongtei E. Tseng, Canton, MI (US); Zhengyu Dai, Canton, MI (US); Steven J. Szwabowski, Northville, MI (US); Felix Nedorezov, Rochester Hills, MI (US); Christopher J. Teslak, Plymouth, MI (US); Bradley D. Riedle, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 110 days.

(21) Appl. No.: 14/267,102

(22) Filed: May 1, 2014

(65) Prior Publication Data
US 2015/0316145 A1 Nov. 5, 2015

(51) Int. Cl.
*F16H 59/18* (2006.01)
*F16H 61/02* (2006.01)

(52) U.S. Cl.
CPC .... *F16H 61/0213* (2013.01); *F16H 2061/0241* (2013.01); *F16H 2061/0244* (2013.01)

(58) Field of Classification Search
None
See application file for complete search history.

(56) References Cited

U.S. PATENT DOCUMENTS

| | | | |
|---|---|---|---|
| 4,485,443 A * | 11/1984 | Knodler | F16H 59/46 475/62 |
| 4,829,434 A | 5/1989 | Karmel et al. | |
| 5,189,621 A | 2/1993 | Onari et al. | |
| 5,267,491 A * | 12/1993 | Sumimoto | F16H 61/08 477/155 |
| 5,285,523 A | 2/1994 | Takahashi | |
| 5,396,523 A | 3/1995 | Hedberg | |
| 5,436,834 A | 7/1995 | Graf et al. | |
| 5,483,446 A | 1/1996 | Momose et al. | |
| 5,519,610 A | 5/1996 | Tsutsui et al. | |
| 5,857,161 A | 1/1999 | Zeilinger et al. | |
| 6,078,857 A | 6/2000 | Jung et al. | |
| 6,480,775 B2 | 11/2002 | Cho | |
| 6,882,919 B2 | 4/2005 | Lee et al. | |
| 7,069,132 B2 | 6/2006 | Henneken et al. | |
| 7,390,284 B2 | 6/2008 | Wheals | |
| 7,693,637 B2 | 4/2010 | Mensler et al. | |

(Continued)

OTHER PUBLICATIONS

D. Feliv, O. Georgieva, "An Extended Version of the Gustafson-Kessel Algorithm for Evolving Data Stream Clustering," In: Angelov, Feliv, Kasabov (Eds.): Evolving Intelligent Systems, pp. 293-315, John Wiley and Sons, New York, 2010.

(Continued)

*Primary Examiner* — Edwin A Young
(74) *Attorney, Agent, or Firm* — James Dottavio; MacMillan, Sobanski & Todd, LLC

(57) ABSTRACT

An individual driving value is set as a function of an accelerator pedal position. In turn, a powertrain characteristic is set as a function of the individual driving style. The set powertrain characteristic may be modified on the basis of a feedback value corresponding to learned preferences of a driver. The modified powertrain characteristic is then either automatically implemented for operation of a powertrain or communicated as a choice for implementation. The feedback value is updated per a response to automatic implementation or choice communication.

20 Claims, 2 Drawing Sheets

(56) References Cited

U.S. PATENT DOCUMENTS

| | | | |
|---|---|---|---|
| 8,715,136 B1* | 5/2014 | Dai | B60W 10/06 477/5 |
| 2002/0119863 A1* | 8/2002 | Kim | F16H 61/061 477/70 |
| 2005/0090963 A1 | 4/2005 | Kuhn et al. | |
| 2009/0306866 A1 | 12/2009 | Malikopoulos | |
| 2009/0312926 A1 | 12/2009 | MacFarlane et al. | |
| 2010/0063697 A1 | 3/2010 | Lindgren et al. | |
| 2013/0173111 A1* | 7/2013 | Syed | B60W 50/14 701/36 |

OTHER PUBLICATIONS

K. Prakah-Asante, D. Feliv, J. Lu, "Hybrid Intelligent System for Driver Workload Estimation for Tailored Vehicle-Driver Communication and Interaction", Proc. IEEE Int. Conference on Systems, Man, & Cybernetics, Istanbul, Oct. 2010, 1178-1184.

* cited by examiner

DRIVER AWARE ADAPTIVE SHIFTING

BACKGROUND OF INVENTION

The present application relates to a method of controlling an automotive powertrain and in particular to a method of adapting characteristics of the powertrain to correspond to a driving style.

Powertrains for automotive vehicles may include individually variable powertrain characteristics. For example, variable powertrain characteristics may include a shift duration, shift sensitivity, shift sequence, torque converter operation schedule, powertrain hunting, engine start/stop system, and delayed upshifts. The vehicles have increased computational power that allows for estimating preferences of a driver and adjusting the powertrain characteristics accordingly.

However, generalized powertrain characteristic adjustments may be unsatisfactory to a driver of the vehicle.

SUMMARY OF INVENTION

An embodiment contemplates a method of controlling an automotive powertrain. An individual driving value is set as a function of an accelerator pedal position. A powertrain characteristic is set as a function of the pedal value and a preset limit. The set characteristic is modified as a function of a feedback value. The powertrain is operated based on the modified characteristic. The feedback value is updated per a response to the applied characteristic.

Another embodiment contemplates a method of controlling an automotive powertrain. An individual driving value is set as a function of an accelerator pedal position. A powertrain characteristic is set as a function of the pedal value and a preset limit. The set characteristic is modified as a function of a feedback value. A driver choice is communicated based on the modified set characteristic. The feedback value is updated per a response to the communicated driver choice.

Another embodiment contemplates a method of controlling an automotive powertrain. A pedal value is set as a function of an accelerator pedal position. A powertrain characteristic is set to a first characteristic when the pedal value exceeds a first limit and a second characteristic when the pedal value is below a second limit. The set characteristic is modified as a function of a feedback value. The feedback value is updated per a response to the modified characteristic.

An advantage of an embodiment is that a driving style may be identified. The identified driving style may serve as a basis of an adjustment to the powertrain characteristic. This increases the likelihood of a satisfactory powertrain characteristic adjustment for the driver of the vehicle.

DETAILED DESCRIPTION

Figure 1:
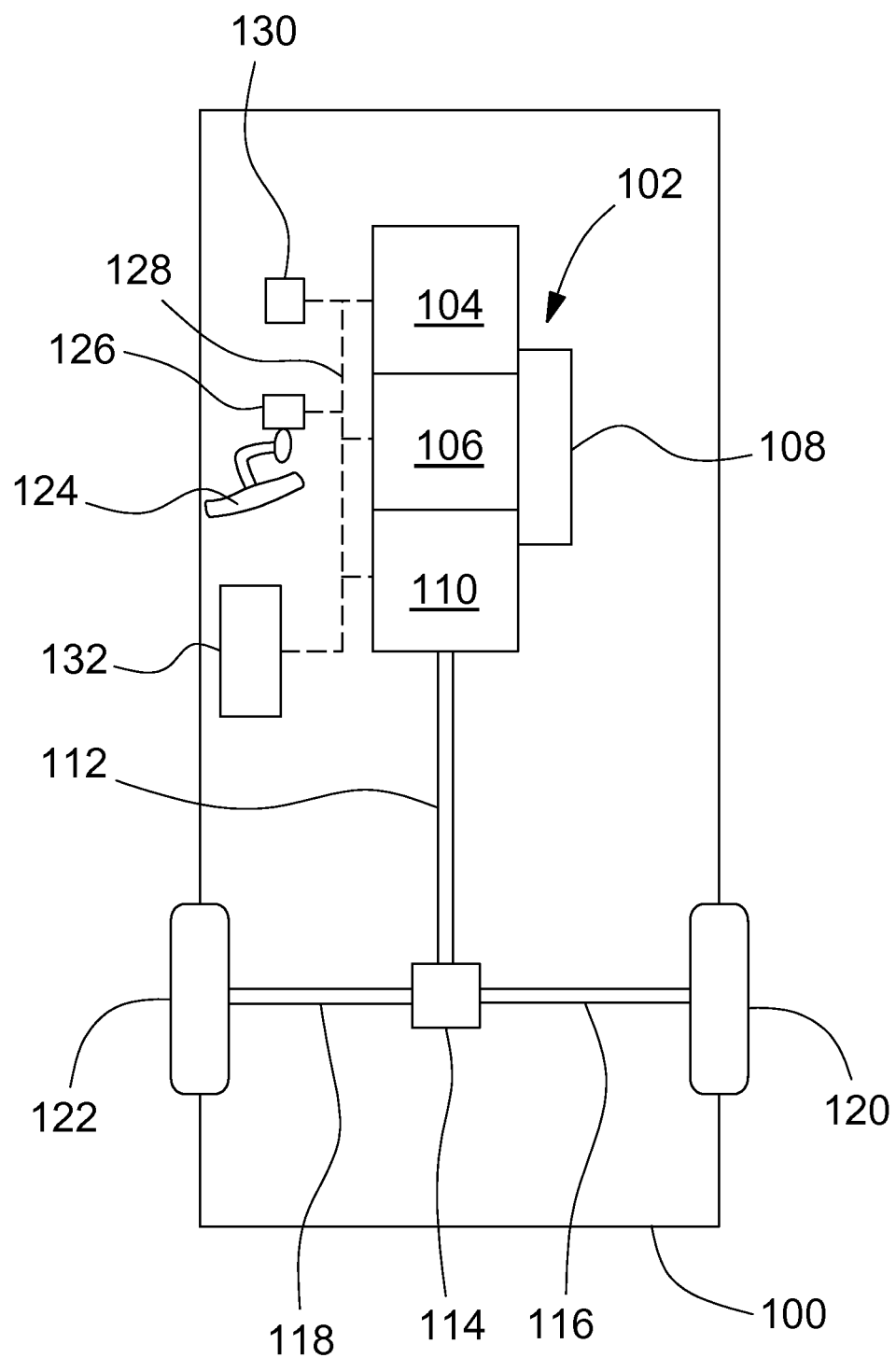
FIG. 1 is a schematic view of an automotive powertrain.

FIG. 1 schematically illustrates an automotive vehicle 100 having a powertrain 102. The powertrain 102 may be a conventional powertrain known to one skilled in the art. As illustrated, the powertrain 102 is an internal combustion engine powered powertrain in a rear wheel drive configuration. As understood by one skilled in the art, the powertrain 102 may also be a hybrid electric powertrain, electric powertrain, fuel cell powertrain, or other suitable powertrain in a front wheel drive configuration, all wheel dive configuration, or other suitable configuration.

The exemplary powertrain 102 comprises an internal combustion engine 104, a torque converter 106, and a transmission 110. The engine 104 generates engine torque that is transmitted via the torque converter 106 to the transmission 110. The torque converter 106 may include a torque converter bypass clutch 108 for locking the torque converter 106. The transmission 110 outputs transmission torque to the driveshaft 112. The driveshaft 112 transmits the transmission torque, via a differential 114, to first and second axles 116 and 118, respectively. In turn, first and second axles 116 and 118, respectively, transmit the transmission torque to the first and second wheels 120 and 122, respectively. As understood by one skilled in the art, frictional losses from powertrain components will reduce the torque transmitted through the powertrain 102. First and second wheels 120 and 122, respectively, apply wheel torque to a driving surface to propel the vehicle 100.

Speed and torque output of the engine 104 may be controlled by an accelerator pedal 124, via a powertrain controller 130. A pedal position (AP) of the pedal 124 corresponds to operation of the powertrain 102 desired by a driver of the vehicle 100. The desired operation of the powertrain 102 may include producing a desired output torque for the engine 104 or a desired wheel torque at the wheels 120 and 122, respectively. The pedal position is measured by a suitable means known to one skilled in the art. For example, a sensor 126 may measure the pedal position and transmit it, via a data bus 128, to the controller 130. The controller 130 may be a single controller or multiple controllers in communication with one another and may be made up of various combinations of hardware and software as is known to those skilled in the art.

The controller 130 controls operation of the powertrain 102, including the engine 104, torque converter 106, and transmission 110. The controller 130 uses the transmitted pedal position to produce the desired operation of the powertrain 102. The bus 128 also connects the controller 130 with a human machine interface 132. Via the human machine interface 132, the driver may interact with the powertrain 102 to control powertrain characteristics of the powertrain 102. For example, the human machine interface 132 may be a touch screen system configured, as known to one skilled in the art, to display messages to the driver and receive input from the driver.

Figure 2:
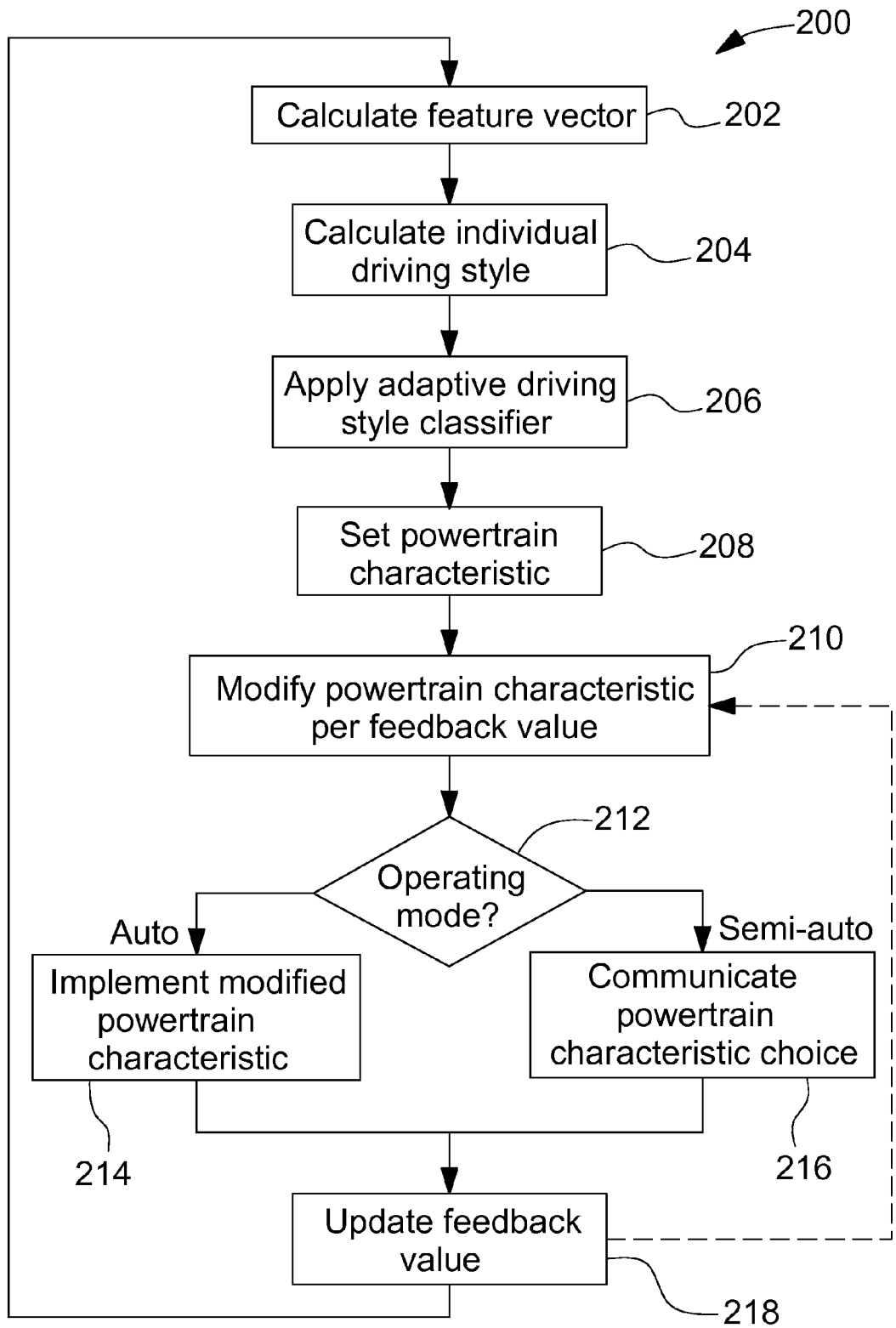
FIG. 2 is a flowchart of a powertrain control routine.

FIG. 2 will now be discussed with reference to FIG. 1. FIG. 2 illustrates a control routine 200 for the powertrain 102.

In a step 202, a feature vector characterizing a driving style is defined. The controller 130 uses the pedal position to calculate a time derivative of the pedal position (AP'). AP and AP' are recorded as the feature vector:

$$x_s = [AP\ AP']^T \qquad (EQN.\ 1).$$

The feature vector defines a relationship between the torque request made by the driver of the vehicle 102 and a driving style preference of the driver. Individual driving styles are associated with the total variability of the feature vector. A determinant of a covariance matrix is a measure of variability of the feature vector—i.e., characterization of the driving style:

$$detF = det(cov(x_s)) \qquad (EQN.\ 2).$$

In a step 204, an individual driving style value is determined by the recursively calculated determinant of the covariance matrix of the feature vector at each measurement of the pedal position, which gives:

$$detF_{new}=(1-\alpha)^{n-1}detF_{old}(1\alpha+(x_s-v_{old})Q_{old}(x_s-v_{old})^T) \quad \text{(EQN. 3)}$$

wherein:

$$v_{new}=(1-\alpha)v_{old}+\alpha x_s \quad \text{(EQN. 4a)}$$

$$v_{old}:=v_{new} \quad \text{(EQN. 4b),}$$

$$Q_{new}=(I-G(x_s-v_{old}))Q_{old}(1-\alpha)^{-1} \quad \text{(EQN. 5a),}$$

$$Q_{old}:=Q_{new} \quad \text{(EQN. 5b), and}$$

$$G=Q_{old}(x_s-v_{old})^T\alpha(1-\alpha+\alpha(x_s-v_{old})Q_{old}(x_s-v_{old})^T)^{-1} \quad \text{(EQN. 6)}$$

and wherein $v_{new}$ is a feature vector exponentially smoothed at a time k, $v_{old}$ is the feature vector exponentially smoothed at a time k−1, $Q_{new}$ is an estimated inverse covariance matrix at the time k, $Q_{old}$ is the estimated inverse covariance matrix at the time k−1, G is an intermediate matrix, n is a dimensionality of the feature vector (here, n=2), and a is a forgetting factor related to a filter memory depth. One skilled in the art will recognize that the individual driving style value may be determined using additional driving characteristics, in addition to the pedal position, such as a second derivative of the pedal position, a braking torque request, or environmental parameters. The additional driving characteristics will alter the dimensionality of the feature vector.

The forgetting factor α is chosen to achieve a sufficient moving window length for measuring the pedal position and is a function of a sample rate for measuring the pedal position. The moving window length is approximately equal to a reciprocal of the forgetting factor. For example, the forgetting factor may be 0.02 (α=0.02) to correspond to a moving window of length of approximately 1/0.02=50.

In a step 206, the individual driving style value is used with an adaptive driving style classifier to determine a driving style classification. The driving style classification is determined by the classifier using an unsupervised classification algorithm derived from statistical processing control techniques well known to those skilled in the art. The driving style classification is determined as a function of where the individual driving style value falls relative to one or more process control limits. The process control limit may be preset for the powertrain 102. Operation of the adaptive driving style classifier is recursive and occurs as the individual driving style value is updated as the feature vector changes due to pedal position changes.

The following non-limiting example describes first and second process control limits for the driving style classifier. One skilled in the art will recognize that, as discussed, there may be fewer or more than two process control limits for the driving style classifier. For example, the driving style classification may be a sport or comfort classification. Alternative driving style classifications may be defined on the basis of fuel economy, drivability, or other considerations. Operation of the powertrain 102 without having set at least one of the powertrain characteristics is a default driving style classification.

For the sport and comfort classifications, the first limit may be a sport lower control limit ($LCL_{sport}$) and the second limit may be a comfort upper control limit ($UCL_{comfort}$). The sport lower control limit and the comfort upper control limit are set as:

$$LCL_{sport}=\mu_s-3\sigma_s \quad \text{(EQN. 7) and}$$

$$UCL_{comfort}=\mu_c-3\sigma_c \quad \text{(EQN. 8), respectively,}$$

wherein $\mu_s$ and $\sigma_s$ are a mean and standard deviation, respectively, of the sport classification and $\mu_c$ and $\sigma_c$ are a mean and standard deviation, respectively, of the comfort classification. The individual driving style value is classified as the sport classification if the individual driving style value is greater than the sport lower control limit and as the comfort classification if the individual driving style value is less than the comfort upper control limit.

When the individual driving style value is between the first and second limit, then the classifier does not determine a new driving style classification and a current driving style classification is maintained. When the current driving style classification is maintained, so too are current powertrain characteristics maintained.

When the individual driving style value is classified as either sport or comfort, then the mean and standard deviation for the driving style classifications are recursively updated. For the sport classification:

$$\mu_{s,new}=(1-\beta)\mu_{s,old}+\beta(detF_{new}) \quad \text{(EQN. 9)}$$

$$H_{s,new}=(1-\beta_2)H_{s,old}+(1-\beta_2)\beta_2(detF_{new}-\mu_{s,old})^T(detF_{new}-\mu_{s,old}) \quad \text{(EQN. 10)}$$

$$\sigma_{s,new}=H^{0.5}_{s,new} \quad \text{(EQN. 11)}$$

Similarly, for the comfort classification:

$$\mu_{c,new}=(1-\beta)\mu_{c,old}+\beta_{c,old}+\beta(detF_{new}) \quad \text{(EQN. 12)}$$

$$H_{c,new}=(1-\beta_2)H_{c,old}+(1-\beta_2)\beta_2(detF_{new}-\mu_{c,old})^T(detF_{new}-\mu_{c,old}) \quad \text{(EQN. 13)}$$

$$\sigma_{c,new}=H^{0.5}_{c,new} \quad \text{(EQN. 14)}$$

wherein β and $\beta_2$ are forgetting factors related to the filter memory depth.

As with the α forgetting factor, the β and $\beta_2$ forgetting factors define lengths of moving windows for calculating $\mu_{s,new}$, $H_{s,new}$, $\mu_{c,new}$, and $H_{c,new}$. The lengths of the moving windows for calculating $\mu_{s,new}$, $H_{s,new}$, $\mu_{c,new}$, and $H_{c,new}$ are approximated by reciprocals of the β and $\beta_2$ forgetting factors, 1/β and 1/$\beta_2$, respectively. The $\beta_2$ forgetting factor may be significantly smaller than the β forgetting factor because more samples are generally required to have a sufficiently accurate estimate. A default value for the $\beta_2$ forgetting factor may be 50% of the β forgetting factor.

Relative to the α forgetting factor, values used for the β and $\beta_2$ forgetting factors should be smaller to provide reliable estimation of the individual driving style value. Smaller values reflect that statistical characteristics of driving style classifications are learned more slowly than actual estimation of the individual driving style value. As such, reasonable values of the β and $\beta_2$ forgetting factors may be 0.01 and 0.05, respectively.

Initial values for the driving style classification means and standard deviations may be determined through benchmarking of the powertrain 102. For the sport and comfort styles, the initial values may be chosen such that $LCL_{sport}$ is greater than $LCL_{comfort}$. Indeed, the process control limits for any of the previously discussed driving style classifications may be preset for the powertrain 102.

In a step 208, the driving style classification is used to set one or more of the powertrain characteristics, which may include an upshift duration, downshift duration, downshift sensitivity, downshift shift sequence, torque converter scheduling, powertrain hunting, engine start/stop schedule, or upshift schedule (known to those skilled in the art as "fast-off"). The upshift duration powertrain characteristic may include time to change to a higher gear ratio or transfer torque during a gear ratio upshift. The downshift duration powertrain characteristic may include time to change to a lower gear ratio or transfer torque during a gear ratio downshift. The downshift sensitivity powertrain characteristic may include the aggressiveness with which the transmission 110 downshifts. The downshift shift sequence powertrain characteristic may include bypassing intermediate gear ratios between starting and final gear ratios. The torque converter schedule powertrain characteristic may include a duration of torque converter operation, as is understood by one skilled in the art, with the torque converter bypass clutch 108 locked. The engine start/stop schedule powertrain characteristic may include delaying or more frequently shutting down the engine 104. The upshift schedule powertrain characteristic may include delaying upshifting the transmission 110. The powertrain characteristics may effect time required to achieve the torque requested by the driver (for example, wheel torque or engine torque).

Continuing the non-limiting sport and comfort classification example, for the sport classification, relative to the default driving style classification, one or more of the following powertrain characteristics may be set: the upshift and downshift durations may be shortened, the downshift sensitivity may be increased, the downshift shift sequence may more frequently bypass intermediate gear ratios, the torque converter schedule may keep the bypass clutch open for a longer accelerator tip-in, the powertrain hunting may allow for more shift busyness (i.e., greater frequency of shifts occurring during a given period of time), or the engine start/stop schedule may minimize shutting down the engine 104. Alternatively, for example, for the comfort classification, relative to the default driving style classification, one or more of the following powertrain characteristics may be set: the upshift and downshift durations may be increased, the downshift sensitivity may be decreased, the downshift shift sequence may less frequently bypass intermediate gear ratios, the torque converter schedule may keep the bypass clutch locked more frequently, the powertrain hunting may allow for less shift busyness, or the engine start/stop schedule may more frequently shut down the engine 104.

In a step 210, the set powertrain characteristic may be modified on the basis of a feedback value. The feedback value is in the form of a transition matrix that summarizes preferences of the driver. When the transition matrix indicates past driver agreement with the set powertrain characteristic, the set powertrain characteristic may be modified to accentuate the set powertrain characteristic. For example, when past driver agreement indicates agreement with the upshift and downshift durations being shortened under the sport classification, the upshift and downshift durations may be modified by further shortening. This preference is determined by higher frequencies below a main diagonal of the transition matrix.

Alternatively, when the transition matrix indicates past driver agreement with the set powertrain characteristic the set characteristic may be used without modification. High frequencies on the main diagonal show a good match between driver perception and the control routine 200.

Alternatively, when the transition matrix indicates past driver disagreement with the set powertrain characteristic, the set powertrain characteristic may be modified to diminish the set powertrain characteristic. For example, when past driver agreement indicates disagreement with the upshift and downshift durations being shortened under the sport classification, the upshift and downshift durations may be modified by lengthening. Lengthening of the upshift and downshift durations is a tunable parameter, for example, for lower shift schedule sensitivity or longer duration of downshifting. For example, the upshift and downshift durations may be varied between 0.01% to 0.05% of nominal settings. Determination of the transition matrix is discussed in a step 218.

In a step 212, the controller 130 determines whether the routine 200 is operating in an automatic mode or a semiautomatic mode. In the automatic mode, the modified powertrain characteristic is implemented automatically by the controller 130 in a step 214. In the semiautomatic mode, the modified powertrain characteristic is communicated to the driver in a step 216, via the human machine interface 132, as a choice for the driver to implement.

For automatic implementation, the controller 130 operates the powertrain 102 per the modified characteristic. When the modified powertrain characteristic is implemented automatically, an override option is communicated to the driver via the human machine interface 132. An agreement or disagreement response to automatic implementation is recorded in the transition matrix. The agreement response may be the driver or another system of the vehicle 100 not overriding automatic implementation and the disagreement response may be the driver, via the human machine interface 132, or another system of the vehicle 100 overriding automatic implementation.

Alternatively, when the modified powertrain characteristic is communicated to the driver for implementation, the agreement or disagreement response is again recorded, now in response to the communicated choice. The agreement response to the driver choice may be the driver implementing the modified powertrain characteristic. The disagreement response to the driver choice may be the driver not implementing the modified powertrain characteristic.

Alternatively, the driver may manually set the powertrain characteristics. As discussed, the powertrain characteristics may be manually set via the human machine interface 132.

The agreement and disagreement responses are used to update the transition matrix in the step 218. Initial values of the transition matrix are zero, which corresponds to no information. Frequencies of the agreement or disagreement responses are recurrently updated in the transition matrix:

$$F_{ij}(k) = F_{ij}(k-1) + \phi(f_{ij}(k) - F_{ij}(k-1))$$

wherein $F_{ij}$ is a current frequency of the agreement or disagreement responses, $f_{ij}(k)$ is a Boolean variable taking values of 1 for the agreement response and 0 for the disagreement response, and $\phi$ is a transition matrix forgetting factor that allows capturing the agreement or disagreement responses over a longer sequence of updates. For example, a typical value of $\phi=0.05$ corresponds to 20 updates (1/0.05=20) for the sequence of updates. The updated transition matrix is used as the feedback value in the step 210.

After updating the transition matrix, the routine 200 returns to the step 202.

While certain embodiments of the present invention have been described in detail, those familiar with the art to which this invention relates will recognize various alternative designs and embodiments for practicing the invention as defined by the following claims.

The invention claimed is:
1. A method of controlling an automotive powertrain comprising:
setting an individual driving value as a function of an accelerator pedal position;
setting a powertrain characteristic as a function of the individual driving value and a preset limit;
modifying the set characteristic as a function of a feedback value;
operating the powertrain based on the modified characteristic;

updating the feedback value per a response to the modified characteristic.

2. The method of claim 1 wherein the powertrain characteristic is set when the individual driving value exceeds the preset limit.

3. The method of claim 1 wherein the powertrain characteristic is set when the preset limit exceeds the individual driving value.

4. The method of claim 1 wherein, as a function of the individual driving value and the preset limit, the powertrain characteristic is maintained as a current characteristic.

5. The method of claim 1 comprising the further steps of:
setting the powertrain characteristic as a function of the individual driving value, the preset limit, and a second preset limit, wherein the powertrain characteristic is set to a first characteristic when the individual driving value exceeds the preset limit and a second characteristic when the individual driving value is below the second preset limit;
maintaining a current characteristic when the individual driving value neither exceeds the preset limit nor is below the second preset limit.

6. The method of claim 1 wherein the individual driving value is a function of the accelerator pedal position and an additional driver characteristic input.

7. The method of claim 1 wherein the powertrain characteristic is set to achieve a desired torque amount in a desired time period.

8. A method of controlling an automotive powertrain comprising:
setting an individual driving value as a function of an accelerator pedal position;
setting a powertrain characteristic as a function of the individual driving value and a preset limit;
modifying the set characteristic as a function of a feedback value;
communicating a driver choice based on the modified set characteristic;
updating the feedback value per a response to the communicated driver choice.

9. The method of claim 8 wherein the powertrain characteristic is set when the individual driving value exceeds the preset limit.

10. The method of claim 8 wherein the powertrain characteristic is set when the preset limit exceeds the individual driving value.

11. The method of claim 8 wherein, as a function of the individual driving value and the preset limit, the powertrain characteristic is maintained as a current characteristic.

12. The method of claim 8 comprising the further steps of:
setting the powertrain characteristic as a function of the individual driving value, the preset limit, and a second preset limit, wherein the powertrain characteristic is set to a first characteristic when the individual driving value exceeds the preset limit and a second characteristic when the individual driving value is below the second preset limit;
maintaining a current characteristic when the individual driving value neither exceeds the preset limit nor is below the second preset limit.

13. The method of claim 8 wherein the individual driving value is a function of the accelerator pedal position and an additional driver characteristic input.

14. The method of claim 8 wherein the powertrain characteristic is set to achieve a desired torque amount in a desired time period.

15. A method of controlling an automotive powertrain comprising:
setting an individual driving value as a function of an accelerator pedal position;
setting a powertrain characteristic to a first characteristic when the individual driving value exceeds a first limit and a second characteristic when the individual driving value is below a second limit;
modifying the set characteristic as a function of a feedback value;
updating the feedback value per a response to the modified characteristic.

16. The method of claim 15 comprising the further step of:
applying the modified characteristic to the powertrain, wherein the response is whether applying the modified characteristic to the powertrain is overridden.

17. The method of claim 15 comprising the further step of:
communicating a driver choice based on a recommended modified set characteristic, wherein the response is whether the recommended characteristic is applied.

18. The method of claim 15 comprising the further step of:
maintaining a current characteristic when the individual driving value neither exceeds the first limit nor is below the second limit.

19. The method of claim 15 wherein the individual driving value is a function of the accelerator pedal position and an additional driver characteristic input.

20. The method of claim 15 wherein the powertrain characteristic is set to achieve a desired torque amount in a desired time period.

* * * * *